(No Model.)

C. S. WRIGHT.
KNIFE GUARD.

No. 460,928. Patented Oct. 6, 1891.

WITNESSES:
Paul Johst
C. Sedgwick

INVENTOR:
C. S. Wright
BY Munn & Co.
ATTORNEYS

UNITED STATES PATENT OFFICE.

CHARLES S. WRIGHT, OF SKANEATELES, NEW YORK, ASSIGNOR TO ELLA M. WRIGHT, OF SAME PLACE.

KNIFE-GUARD.

SPECIFICATION forming part of Letters Patent No. 460,928, dated October 6, 1891.

Application filed December 8, 1890. Serial No. 373,945. (No model.)

*To all whom it may concern:*

Be it known that I, CHARLES S. WRIGHT, of Skaneateles, in the county of Onondaga and State of New York, have invented a new and Improved Knife-Guard, of which the following is a full, clear, and exact description.

My invention relates to improvements in knife-guards, the guard being intended for use in cutting cheese. Every retailer of cheese knows that a great quantity of cheese is wasted in cutting, as the cheese crumbles away beneath the knife, and the irregular movement of the knife also scrapes away considerable portions of the cheese; and the object of my invention is to produce a guard which may be conveniently adapted to a cheese and which will serve to guide the cheese-knife, so that the cheese may be neatly, easily, and accurately cut, without waste.

To this end my invention consists in a knife-guard constructed substantially as hereinafter described and claimed.

Reference is to be had to the accompanying drawings, forming a part of this specification, in which similar letters of reference indicate corresponding parts in all the figures.

Figure 1:
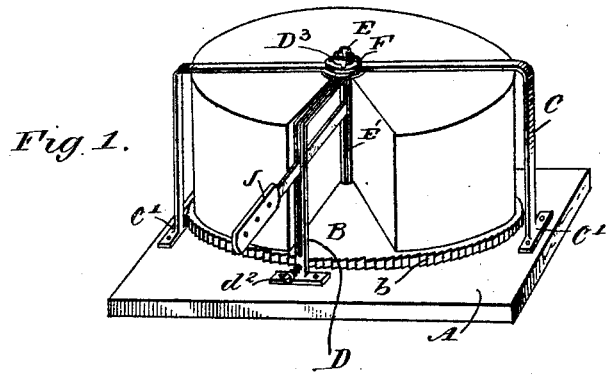
Figure 3:
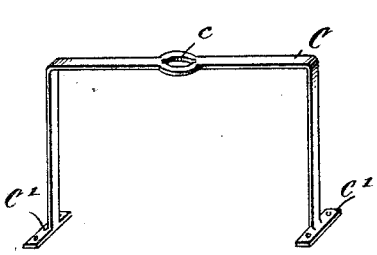
Figure 4:
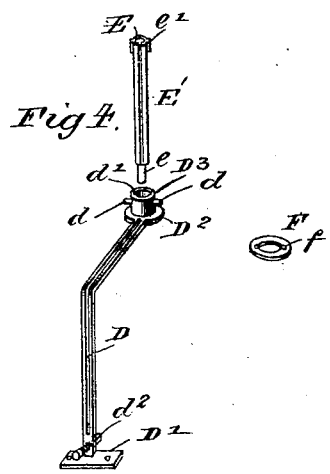
Figure 2:
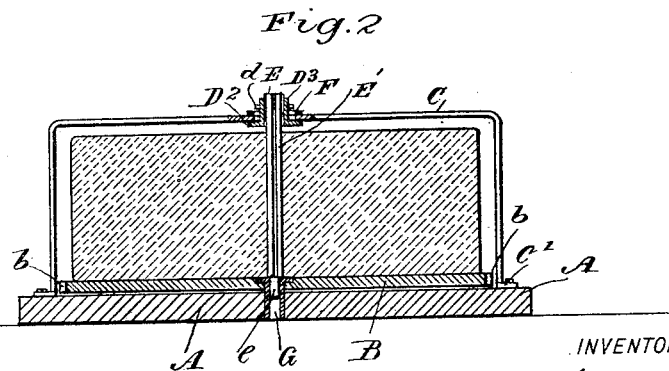

Figure 1 is a perspective view showing the guard and the attachments used therewith, as applied to a cheese, a portion of the cheese being cut away to expose the knife and its guides. Fig. 2 is a vertical cross-section through the cheese and through the pivoted parts of the frame and guard. Fig. 3 is a detail perspective view of the main frame, which extends over the cheese; and Fig. 4 is a detail view of the knife-guard, the central tube, and the washer for fastening the parts together.

The device is provided with a base A, which is adapted to rest upon any convenient support, and pivoted on the top of the base is a circular plate or table B, around the edge of which are teeth $b$, the table B being provided with the usual casters or bearings. The table B is pivoted on base A by a hollow bushing G, which extends down through the table and base and has a flange at its upper end, which is embedded in the upper surface of the table and firmly secured thereto.

An inverted-U-shaped frame C, which is large enough to extend over any ordinary cheese, is mounted centrally on the base A, the frame having feet C', which are secured to the base, and the central portion of the frame is thickened and perforated, as shown at $c$, to receive the center tube E, and has recesses through which the lugs $d\,d$, hereinafter mentioned, pass in putting the parts together.

A bent guard D is affixed to the base A in such a manner that it will be at right angles to the frame C, the said guard having a suitable foot D', which is secured to the base A, and having its inner end formed into a washer $D^2$, which carries a short tube $D^3$, having projecting lugs $d$ on the outside and grooves $d'$ on the inside to receive the lugs on the center tube E. The guard D has also near the bottom a spring-bolt $d^2$, which extends through it and engages the teeth on the plate or table B, and which thus prevents the table from turning.

A vertical standard or post, consisting, preferably, of a tube E, is adapted to extend vertically through the short tube $D^3$ in the thickened portion $c$ of the frame C, the said tube having a vertical slot E', extending throughout its entire length and having at the bottom a pin $e$, which extends downward through the table or plate B and bushing G and forms the axis on which the table turns. A grooved bar, reduced at the lower end to form the pin $e$, may be substituted for the slotted tube E. The slot in the center tube E is made to align with the slot in the guard D, and in order that it may be held in this position the tube is provided at the top on opposite sides with lugs $e'$, which enter the grooves $d'$ in the tube $D^3$.

When the device is set up, the frame C is secured to the base A, as described, and the guard D is likewise secured to the base with the tube $D^3$, extending upward through the perforation in the frame C, and a cheese is then slipped upon the table or plate B from the back of the frame, and the center tube E is then forced downward through the tube $D^3$, so that the pin $e$ on the lower end of the tube will project through the bushing in the center of the plate B, and the lugs $e'$ will enter the grooves $d'$ of the tube $D^3$. A washer F is then placed over the tube $D^3$, so as to lock the parts of the device together, the washer having notches $f$ to enable it to be placed over the lugs $d$, and after the washer passes beneath the lugs it is turned so as to throw the notches out of alignment with the lugs.

Instead of forcing the center tube E downward through the cheese, a slice may be cut from the cheese, as shown in Fig. 1, thus affording space for the center tube, and it may then be easily placed in position.

To operate the device, the spring-bolt $d^2$ is pulled out and the table or plate B turned so that a desired portion of the cheese will come beneath the slotted guard D, and the blade of a cheese-knife J is then inserted in the upper portion of the slot in the guard and forced inward through the slot until the point enters the slot in the tube E, the guard D serving to guide the knife to the slot in the center tube. The knife is then forced downward through the cheese in the usual manner, and it will be guided the entire distance by the slot in the guard D, so that a smooth even slice will be cut.

From the foregoing description it will be seen that the cheese may be easily brought into a position to cut a slice of any desired size and that when the cut is made, the knife being guided at both ends in the manner described, will cut evenly through the cheese, so that there will be no crumbling or waste.

Having thus fully described my invention, I claim as new and desire to secure by Letters Patent—

1. A knife-guard of the character described, comprising a base, a revoluble plate pivoted thereon, a locking device for the plate, a frame secured to the base and extending over the plate, an angular slotted guard having one end centrally secured to the frame and the opposite end secured to the base, and a slotted center-post extending centrally through the plate and having its upper end held at the junction of the frame and guard, substantially as described.

2. A knife-guard of the character described, comprising a base, a revoluble plate mounted thereon and provided with a toothed edge, an inverted-U-shaped frame secured to the base and extending over the plate, an angular slotted guard having one end secured to the frame and the opposite end to the base, a spring-bolt mounted in the guard and adapted to engage the teeth of the plate, and a slotted center-post extending centrally through the plate and connecting with the frame at its junction with the guard, substantially as described.

3. The combination, with a slotted center-post and a slotted guard connected therewith, said guard having a spring-bolt therein, of a plate pivoted on the post and provided with teeth upon its edge, substantially as described.

4. The combination, with the main frame having a central perforation therein, the slotted guard having its upper end formed into a vertical tube provided on the outside with lugs and on the inside with grooves, and the center-post having lugs to fit the grooves of the guard-tube, of the washer having notches therein to receive the lugs of the guard-tube, substantially as described.

CHARLES S. WRIGHT.

Witnesses:
 GEO. H. WICKS,
 LUCIAN MAX.